(12) United States Patent
Karoliussen

(10) Patent No.: US 7,284,599 B2
(45) Date of Patent: Oct. 23, 2007

(54) HEAT EXCHANGER

(75) Inventor: Hilberg Karoliussen, Risor (NO)

(73) Assignee: Nordic Exchanger Technology AS, Holbjornsvik (NO)

( * ) Notice: Subject to any disclaimer, the term of this patent is extended or adjusted under 35 U.S.C. 154(b) by 377 days.

(21) Appl. No.: 10/381,408

(22) PCT Filed: Sep. 21, 2001

(86) PCT No.: PCT/NO01/00386

§ 371 (c)(1),
(2), (4) Date: Jun. 30, 2003

(87) PCT Pub. No.: WO02/25198

PCT Pub. Date: Mar. 28, 2002

(65) Prior Publication Data

US 2004/0094398 A1    May 20, 2004

(30) Foreign Application Priority Data

Sep. 22, 2000  (NO) ............................... 20004751

(51) Int. Cl.
F28D 9/00 (2006.01)
B01D 1/22 (2006.01)

(52) U.S. Cl. .................. 165/165; 165/157; 165/166; 165/DIG. 399; 29/890.03

(58) Field of Classification Search ........ 165/164–167, 165/157, 110, DIG. 399; 29/890.03
See application file for complete search history.

(56) References Cited

U.S. PATENT DOCUMENTS

| | | | |
|---|---|---|---|
| 1,597,678 A | | 8/1926 | Fisher |
| 3,732,919 A | | 5/1973 | Wilson |
| 3,810,509 A | * | 5/1974 | Kun ............................ 165/148 |
| 4,384,611 A | | 5/1983 | Fung |
| 4,585,523 A | * | 4/1986 | Giddings ..................... 202/236 |
| 5,232,557 A | * | 8/1993 | Kontu et al. ................. 202/182 |
| 5,282,507 A | | 2/1994 | Tongu et al. |
| 5,770,020 A | * | 6/1998 | Koistinen et al. ........... 202/172 |
| 6,059,023 A | | 5/2000 | Kurematsu |
| 6,186,223 B1 | | 2/2001 | Bergh et al. |
| 6,590,770 B1 | * | 7/2003 | Rogers et al. ............... 361/697 |
| 6,622,785 B2 | * | 9/2003 | Haegele et al. ............. 165/177 |
| 6,723,262 B2 | * | 4/2004 | Hidaka et al. .............. 264/40.5 |
| 2002/0174979 A1 | * | 11/2002 | Haegele et al. ............. 165/177 |

FOREIGN PATENT DOCUMENTS

| | | |
|---|---|---|
| NO | 435.292 | 7/1939 |
| SE | 362.137 | 11/1973 |

\* cited by examiner

*Primary Examiner*—Virginia Manoharan
(74) *Attorney, Agent, or Firm*—Dennis G. LaPointe

(57) ABSTRACT

Element for heat exchanging between fluids, where the flowing canals for the fluids are formed of slits on either side of a thin, folded sheet material (1), and that the ratio between the slit width (24) of the canals and depths (25) in the slits is less than 0.15 times the thickness of the sheet material.

4 Claims, 3 Drawing Sheets

HEAT EXCHANGER

The present invention relates to a heat exchanger element for exchanging of heat between two media, an application of the element.

Heat exchangers are well known and used in many connections. The present types of heat exchangers use pipes or sheets as dividing walls between the two media. Based upon considerations as to heat transfer, weight and use of materials, it is an object to develop heat exchangers in which the dividing walls are as thin as possible, but where the structural construction of the exchanger elements still has the necessary strength to be able to withstand the actual pressures in various application periods.

Pipe exchangers are designed with several pipes in the common mantle, or as two coaxial pipes. Such exchangers are well suited to withstand high pressures, and they are also relatively well secured against leakage between the two media. However, since pipes are much more expensive than the corresponding area as sheets, are production costs relative high.

On the other hand are sheet exchangers specially used in applications where there are no absolute requirements as to tightness, and where the exchanger's capacity is high.

In both types of known heat exchangers, are the two media's flow profiles far from ideal. For the known sheet exchanger, which makes a basis for comparison for the present invention, the problem is tied to a limited flow velocity between the sheets. The limitation lies in the fact that input and output channels in each corner are tight in account of the geometry, and the media must make a sharp 90° turn with resulting fall in pressure. It therefore is this geometrical matters and not the flow velocity in the exchanger which provides the limitation for an acceptable pressure fall.

The flow velocity along the exchange element is decisive for the heat transfer between the medium and the area's α-value, and is applied in turbulent flowing of water in calculation of the α-value as a factor of for example 1 at 1 m/sec and 1.8 at 2 m/s.

Previous heat exchangers are known, where each sheet is folded in zigzag form such as it on each side is formed channels through which the actual media circulate, see for example U.S. Pat. No. 1,601,637, EP 0 197 169 and SE 362 137. Common for all these is that they have channel profiles that do not combine necessary area density with a structural strength to permit the use of thin sheets, and such narrow channels that the flow velocity will be high enough. This is relatively fatal because the low heat transfer will demand a larger exchanger, which will mean still lower flow velocity.

Figure 7:
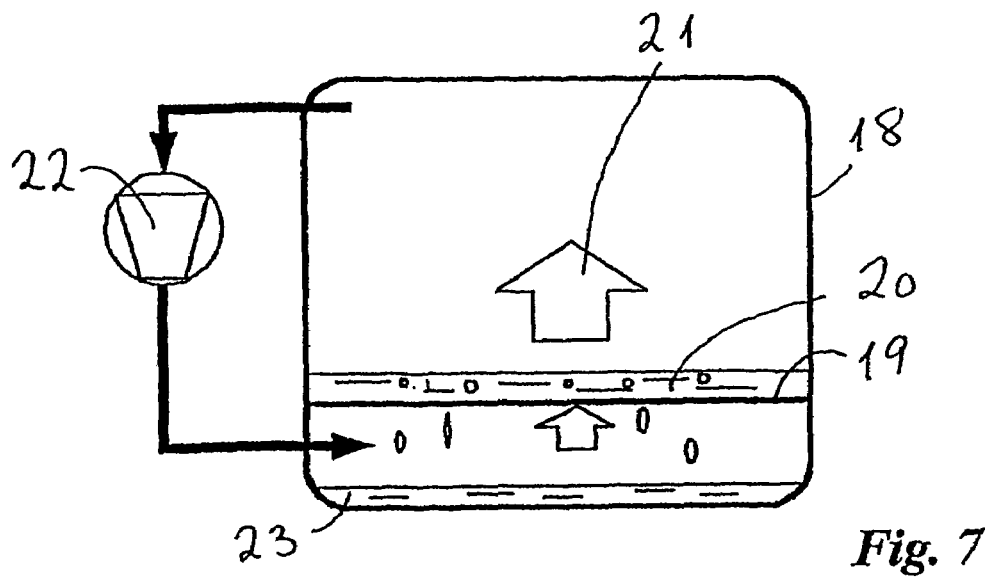

Principles for distillation at recompression of steam are known. FIG. 7 shows for example a chamber 18 which is divided with a dividing wall 19, in which there is a liquid 20 which is heated to the boiling point. The steam 21 from the liquid are sucked into a fan or compressor 22 and are pressed from this one into a room under the dividing wall 19. Because of a higher pressure, the steam will here condense at a temperature which is higher than the temperature of the vaporizing period.

The heat of condensation will therefore go over to the liquid and evaporate a corresponding quantity of new liquid. The condensate 23 can then be tapped at the same time as new liquid is led to the evaporation side.

This principle is applied to day industrially till drying of effluents as for example at production of dry milk, cellulose etc.

The effectiveness factor of the process is calculated from the energy of evaporation respectively fan energy. For a given quantity of distillate, is the fan energy determined by the pressure ratio between evaporation and condensation.

The pressure ratio and therefore the energy consumption depend on how easy necessary heat transfer between the division wall takes place.

Finally, this may be expressed such as the dividing wall's heat transfer, k-value is a decisive criterion as to the size of the area which is necessary on the dividing wall.

With water vapour, is a limit in pressure ratio for one step fans at 1,15, which means about 3,5° C. higher temperature of condensation. With an evaporation temperature of 100° C., the condensation will take place at 103,5° C.

Except for parameters like dust and such, the total heat transfer, namely the k-value, will be determined by:

$$k=1/(1/\alpha 1+s/\lambda+1/\alpha 2)$$

where $\alpha 1$=heat transfer on the condensation side, $\alpha 2$=heat transfer on the evaporation side, s=sheet thickness and $\lambda$ is equal to the sheet material's heat transfer coefficient period.

The lowest value of one of the α-values will then give an asymptotic border value for how high the k-value may be.

With a vertical surface one can achieve a relatively high $\alpha 1$-value for condensation. The value will be higher the less height the surface has. With a height of 50 mm, the α-value is of approx. 13 500 W/m²° C.

However, it is the $\alpha 2$-value on the evaporation side which definitely is the limiting factor at such low temperature differences which can be achieved here. The case is that the temperature difference between the surface and the boiling point minimum must be 7° C. before the water will boil with bubble from the heating surface. With this temperature difference, the water evaporates by the fact that it forms small steam bubbles in the water itself. This form for boiling is called convection boiling because the heat transfer takes place by convection period.

With convection boiling with a temperature difference of 3,5° C., one can not obtain a higher $\alpha 2$-value than about 1 800 W/m²° C. The k-value will therefore be so low that distillation of water at the above pressure and temperature will require 8,8 m²/kg distillate per minute. This is too high to obtain realistic dimensions and costs for such distillation plant.

The only known method to increase the heat transfer at convection boiling, is to set the water in motion with respect to the heating surface, for example by means of a stirring device, propeller or pump.

This is achieved with the heat exchanger according to the present invention as it is defined with the features set forth in the claims.

For the heat exchanger according to the invention, one of the goals has been to achieve a higher heat transfer by self circulation without mechanical aids. The density of the small steam bubbles which is formed in the water at convection boiling, are, however, at the beginning too small to achieve any positive degree of self circulation. The density of the steam bubbles may be increased by increasing the heat radiation against the water. This may, with the given parameters, only be achieved by surrounding small quantities of water with a large heat supply surface, in practice by confining the water in a narrow slit between the sheets.

Figure 1:
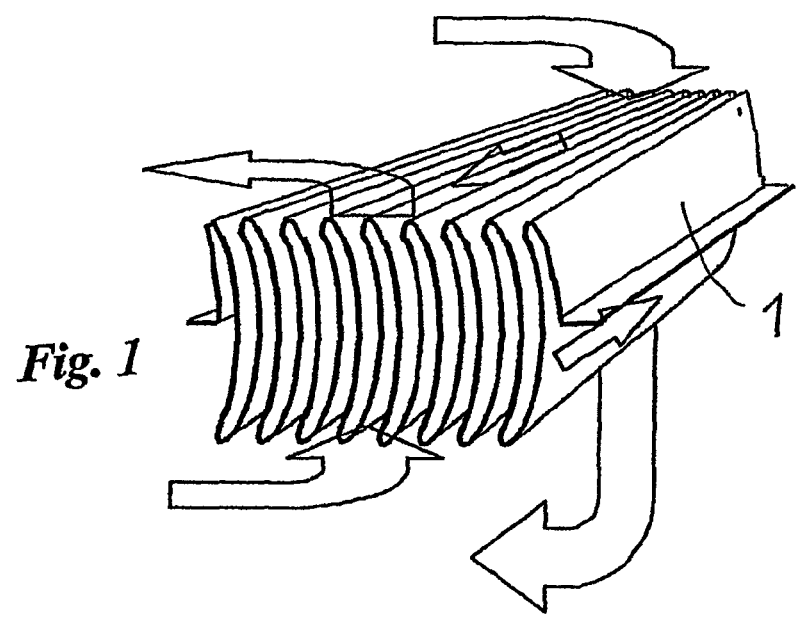
Figure 2:
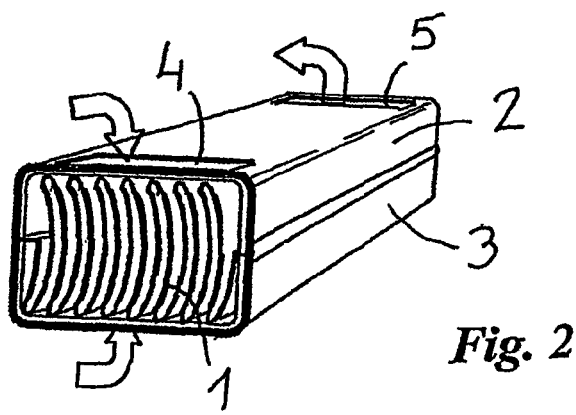
Figure 3:
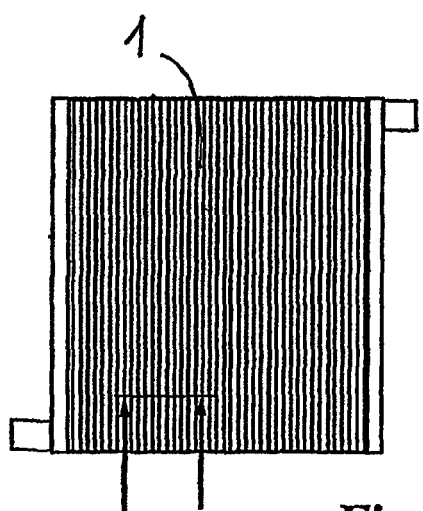
Figure 4:
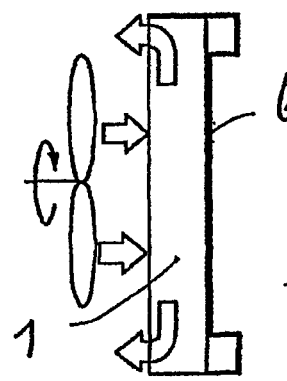
Figure 5:
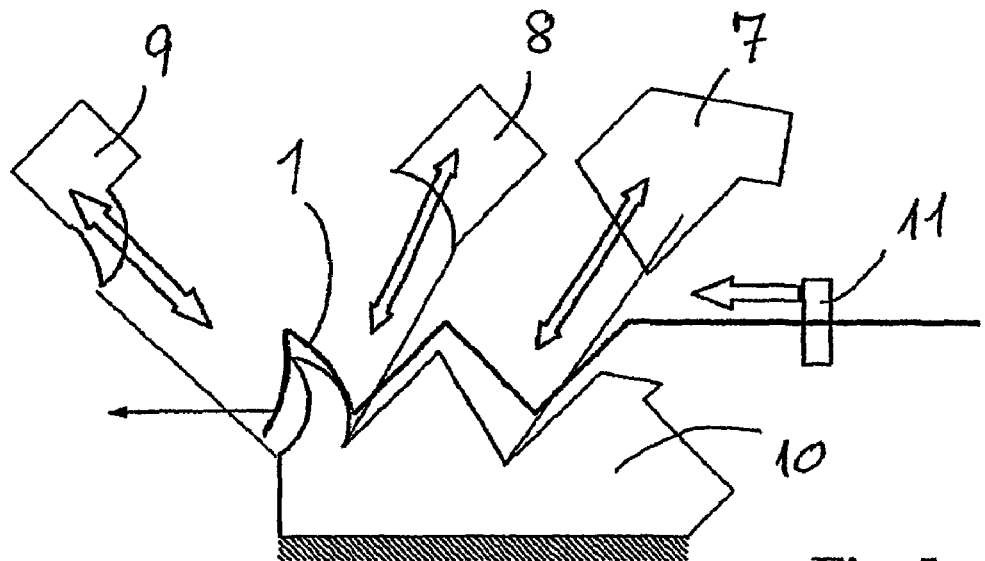
Figure 6:
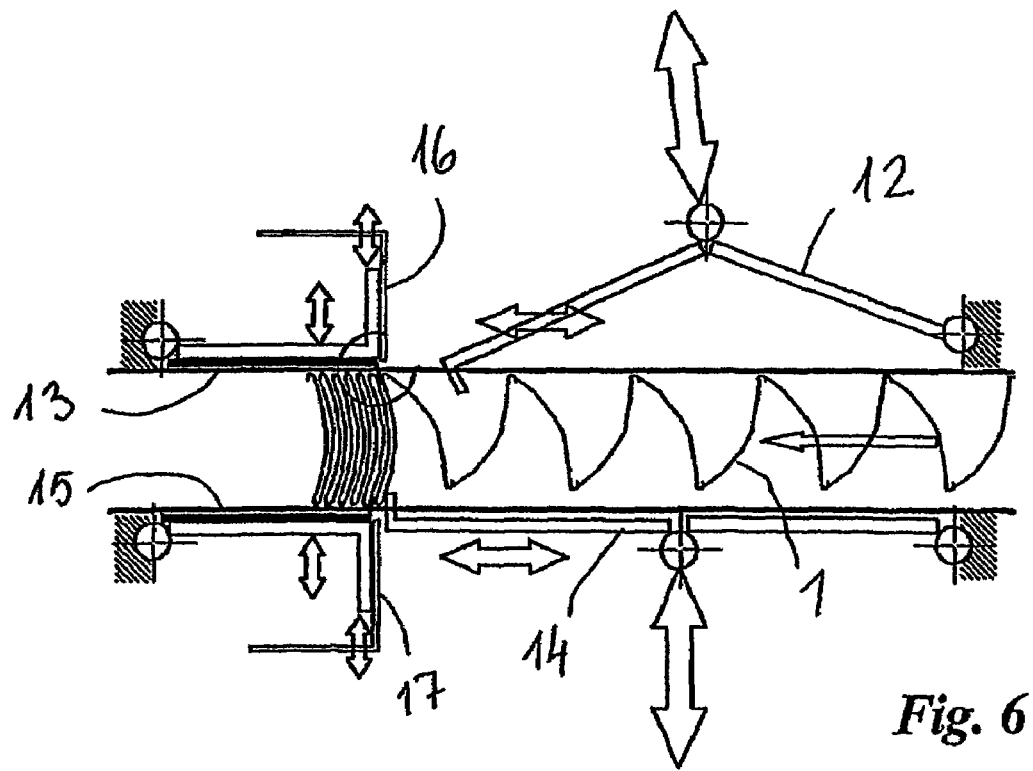
Figure 8:
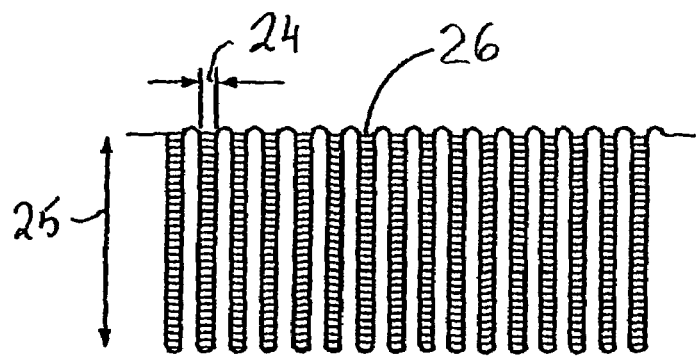

FIG. 1 of the drawings shows a perspective view of a heat exchanger element according to the invention, FIG. 2 shows the exchanger element on FIG. 1 placed in a exchanger housing, FIG. 3 shows a view of the invention used in an air/liquid heat exchanger, FIG. 4 shows a section of the heat exchanger of FIG. 3, FIG. 5 shows schematically the first stage for production of the heat exchanger element according to the invention, FIG. 6 shows the second stage for production, FIG. 7 shows schematically the principle for the process, and FIG. 8 shows schematically a heat exchanger element with plane canals and element walls.

The principle for the heat exchanger is shown in FIG. 8. The sheet is here folded together into slits with the slit width 24 and the slit height or depth 25, where the water appears in the slits that are open to the top, and the condensing steam appears in the slits that are open towards the underside.

It is apparent, that when the slit width 24 gets narrower, will the actual heat flux q (W/m2) radiate a decreasing amount of heat, and a density of the steam bubbles increases. At a certain border the steam bubbles will start to combine to bigger bubbles. This will set the water in strong motion, the heat flux will increase and the quantity of steam bubbles increases, meaning that a self amplifying reaction occurs. The quantity of steam will then be so large that it in the major part of the cross section forms a two faced stream with the steam in the middle of the slit and a thin film of water which is pulled along along the surfaces.

Trials have shown that, with water at 100° C. and a slit with of 1,5-2 mm, is this border at a temperature difference of only 1,8-2° C., and the α-value is increased from about 1 800 W/m$^{2°}$ C. to 18 500 W/m$^{2°}$ C. on the evaporation side. This is about at a level that can be achieved by ordinary fast boiling with a temperature difference of about 18° C. or with film evaporation, which is often used in the above mentioned industrial drying plants.

It has been found that optimal results are achieved when the slit width 24 of the slits forming the fluid flow canals 26 on either side of the thin, folded sheet material 1 and the slit height or depth 25 in the slits forming the flow canals 26 are in a certain ratio to each other and to the sheet thickness. Thus the ratio between the slit width 24 and the slit depth 25 should be less than 0.15 times the thickness of the sheet material. The height of the folds must be limited both to avoid getting too high counter pressure in the steam and so that the condensate on the underside should have a short runoff distance period. A slit height h=50 mm seems to give an optimal result for both sides.

The heat transfer on both sides becomes so good that the sheet thickness starts to have a negative effect on the total k-value. For this reason, but also on account of the weight and the costs, it is an advantage to have a thin sheet as possible. It is now often used 0.4-0.5 mm titanium sheets in the heat exchangers.

With as narrow slits as are necessary here, straight slits as shown on the principle figure could easily be pressed together at a relatively small pressure difference.

In the heat exchanger according to the invention, one has arrived at a method for construction of the element, corrugating of the sheet, which prevents pressing together, but at the same time does not hinder access for cleaning or closes for the flow through of the media, as shown schematically on FIG. 1.

To isolate the two media sides from each other, the slits in the exchanger element must be closed at the ends. In many applications this can easily be done by moulding the ends together in a suitable material.

The ends may also be closed by welding the slits together. Another solution is to press a lid of for example rubber against the ends.

With its high compactness and direct access from both sides for cleaning, is the heat exchanger well suited as a general heat exchanger, for example as a motor cooler. Also in this case will the narrow slits give a special thermal effect. A through flow of liquid will result in that the heat transfer increases with the flow velocity period. When the slit is narrow, the turbulence near the surface is higher than with a broad slit or a pipe, even if the mean flow velocity is the same.

The exchanger element is in this application capsulated into mantel halves equipped with respective input and output at the ends.

The problem may be exemplified with a motor cooler where the temperature is to be lowered about 5 to 8° C. With a canal height of 50 mm, the canal width must not be more than 1.5 to 2 mm wide in order to achieve a velocity of 1.5 to 1.8 m/s. This requires a minimal pressure difference for a thin sheet to buckle, and thereby reduce or close the canals on the opposite side.

The element consists of a thin sheet which is folded to a bellows where all the folding plans are curved in the same direction. Pressure in the canals will affect the canal walls' form if the pressure in the neighbouring canals is different. One side in the canal tries to straighten out while the other side pulls the profile inwards such that the forces approximately equalise each other. An exchanger element 1 is mounted between a top mantel 2 and a bottom mantel 3 which both have input and output canals 4 and 5 in each end. The mantels 2, 3 may also exercise a pressure against the element's canal tops, such that the elements curves are biased and thereby get a further increase structural strength. The curves in the canals' wall surfaces are preferably parallel.

Prototype tests have been carried out with a motor cooler with canal dimensioning as mentioned in the above example, and with a titanium plate only 0.5 mm thick. The construction was able to withstand differential pressure of more than 5 bars without any sign of deformation of the canal walls. High area density compared to the flow through area proved to give α-value of more than 30% higher than for a pipe with the same flow through velocity period. The total heat transfer, k-value, is essentially higher for conventional sheet heat exchangers.

In addition to heat exchanging between liquids, the heat exchanger element according to the invention will be suited for heat exchanging between a liquid by convection, evaporation or condensation on one side, and the gas, for example air, on the other side.

Such an embodiment is shown on FIGS. 3 and 4. On the liquid side it is fastened a sheet 6 which covers the element and is fastened to the canal tops. For very high pressure differences, for example in cooling plants, it could be actual to use wart-like corrugation to increase the active surface.

The invention has some of its foundation in the need for an effective and reasonable combined condenser and evaporator for distillation at the recompression of steam period. One such distillation apparatus is in reality a heat pump where steam from the evaporation side is sucked into a fan and pressed by this one into the condenser side where it on account of the increased pressure condensers at a temperature which is higher than the evaporation temperature. Thereby the condensation heat is transferred to the evaporation side such that a corresponding new amount of liquid will be evaporated. On this way the heat energy is recirculated internally.

On for example ships are used distillation apparatus, so called evaporators, to produce fresh water from sea water. These use excess heat from the motors as the source of energy in a special boiler, and have a special condenser which is cooled with sea water.

The evaporation of sea water has, however, great problems with the arrival at solutions which give a satisfactory heat transfer at the same time as they keep clean. Especially large problem is the so called "scaling", that is that salt and calcium precipitate and forms a hard and heat insulating cover on the heat exchanger surfaces.

The problem is especially caused by the fact that when a steam bubble is formed on a surface of a boiler element, it leaves salt and dry materials that the water contained as crystals on the surface. These residuents will soon form a cover which is fastened by heat because the temperature below the cover rises as result of the increase isolation effect period. Scaling is reduced by application and boiling at low temperature, that is low pressure and dosing with chemicals.

It is correct as it is believed to day that problem with scaling is increased at increasing temperature, but it is not correctly assumed that the temperature itself is the fundamental course. This is in the difference between the boiler element's surface temperature and the boiling point.

A study of the different phases with boiling of water at atmospheric pressure was clearly that the boiling happens at the convection evaporation at a temperature difference between 1 and 7 K, from 7 to 26 K, with bubble evaporation at the surface of the element and more than 26 K at film evaporation. In the different phases the heat transfer $\alpha$-value varies strongly.

The temperature difference at boiling in conventional evaporators lies in the area 15-20K, and the boiling therefore takes place in the bubble phase period. The steam bubbles are formed on the boiler element's surface, and this is the main cause of the scaling problem.

At boiling in the distillation apparatus with the recompressing of the steam, the temperature difference will, because of the power consumption of the fan, be less than 1.5 K, that means that the boiling happens by convection, and the steam bubbles are formed in the water and not on the heat exchanger's surface. Salts and dry materials will then follow the steam bubbles up to the surface and follow the excess water out. To hold the concentration down, it is, as in conventional evaporators, applied about twice as much feed water as the produced amount of distillate.

With a temperature difference of 1.5 K, vary low $\alpha$-value is achieved for the heat transfer, about 1.5-1,8 kW/m$^2$K. This is so low that it in practice cannot be applied because the heat exchanger surface will have to be enormous. It has been shown that the $\alpha$-value can be increased substantially by using forced circulation, for example a stirring device.

The heat exchanger according to the present invention distinguishes itself by a very simple construction, low use of material, very good heat transfer values and grate usefulness within a number of areas.

In the heat exchanger according to the invention, the canals will contain a modest demand of water compared to the large surface which surrounds the water. Even if the specific heating load W/m$^2$ is very low, it will be produced relatively large amount of steam compared to the amount of water in the canals. This creates turbulence in improved $\alpha$-value. The turbulence will move the boarder for convection evaporation to a somewhat higher level.

A heat exchanger of the same type and embodiment as the above mentioned proto type has been tested as a combined evaporator and condenser for distillation by recompressing steam, and it showed that at a boiling temperature for sea water of 100° C. and a condensation temperature of 103° C., it occurs a self amplifying process where $\alpha$-value suddenly starts to rise, the turbulence rises further and the heat transfer increases. The self amplifying effect is apparent from the fact that it takes a few seconds from the first small bubbles appear, until the water is fast boiling.

In the tests with a distillation apparatus with the heat exchanger according to the invention, it shows that the $\alpha$-value stabilizes at 18.5 kW/m$^2$K. The stabilizing indicates the asymptote k-value approaches because the heat transfer on the condensation side is hold relatively constant.

Horizontal placement has proved to give the best result, but it has also been made tests with the angular placement up to a vertical position with relatively acceptable results. At these tests one has covered the evaporation side partly with a sheet 41 with openings at both ends. The lower opening has been standing under a water column Hwc such that the most of the vapour has been driven through the canals upwards and brought with it water, such as a substantial recirculation occurs.

It has been shown that the powerful turbulence keeps the evaporation side clean, and no scaling has been observed over a period of time.

At the above mention temperatures, the steam pressure from the fan corresponds to about 1.5 mVs (mVs is the Norwegian definifion of "metres of WC (water column)"), and it is naturally also with this application necessary with the structural strength given by the curves in the canals. On account of the aggressiveness for the boiling sea water is titan the only useful material, but it is expensive and conducts heat poorly. This is also important moments for making the sheet as thin as possible, and the mechanical strength must be taken care of by the structural construction.

Since the exchanger element according to the invention is formed by a long sheet which is folded, the element is well suited for continual automatically controlled machine production.

For this it has been developed a special method that makes such production possible, where the sheet passes through two machine stations.

In the station in FIG. 5 the sheet is first sharply bent to a step form with two 90° bends, by a tool knife 7. The tool knife 8 and the tool knife 9 descend simultaneously, and form the sheet between the previous bend, either by forming this in curves as shown in FIGS. 1 and 2, or corrugating this on a different way, for example parallel, as shown in FIG. 8. The knives 8 and 9 at the same times make the bending angles sharper. All the tool knives 7, 8 and 9 press down against the stationary forming block 10 with the corresponding profiles. A feeding mechanism 11 pulls the sheet forward after the tool knives have returned to the upper position.

FIG. 6 shows a tool which curves the sheet as shown in FIGS. 1 and 2. With straight corrugated form are the tool knives 8 and 9 and the forming block correspondingly formed with crossing grooves corresponding to the sheet's form.

The pre bent sheet continuous then in the station as shown on FIG. 6. Here each bend is pressed between two pressure plates 12 and 13 on one side and 14 and 15 on the other side, where the sheet bends get their final width. After the pressure plates 12 and 14 have returned to the rear position, the pressure plates 13 and 14 go up and down respectively, and permit feeding to the next bend. To assure the forward feeding, the feeding plates 16 and 15 simultaneously go down and up respectively.

On FIG. 6 the lower pressure plate 14 is in the forward position, and the upper pressure plate 12 in the rear position. When even very thin sheets are to be bent as close as indicated here, it is required at the end very large forces that increase exponentially with reducing bending radius. With the special hinging of the pressure plates 12 and 14, it is achieved a pressing force which is inversely proportional with tangent to the pressure plate's angel. Thereby the force approaches an infinity as the angel and motion approaches zero.

The stations are preferably placed in line and work synchronously.

The invention claimed is:

1. Element for heat exchanging between fluids, the element having fluids flow canals consisting of slits on either side of a thin, folded sheet material (1) and that a ratio between the canals' slit width (24) and depth (25) in the slits is less than 0.15 times a thickness of the sheet material,
    wherein said thickness of the sheet material is about 0.4-0.5 mm and said depth of said slits is about 50 mm.

2. Element according to claim 1, wherein the element's walls in section are formed as equally curved surfaces.

3. Element according to claim 1, wherein the element's walls are formed as plane surfaces.

4. Element according to claim 1, wherein the element's walls are produced in titanium.

* * * * *